(12) United States Patent
Reichert et al.

(10) Patent No.: US 7,685,092 B2
(45) Date of Patent: Mar. 23, 2010

(54) AUTOMATIC PROBLEM-ORIENTED TRANSFORMATION OF DATABASE PERFORMANCE DATA

(75) Inventors: Michael Reichert, Shoenaich (DE); David Wiese, Gera (DE); Norbert Heck, Hildrizhausen (DE)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 11/470,796

(22) Filed: Sep. 7, 2006

(65) Prior Publication Data
US 2007/0185913 A1 Aug. 9, 2007

(30) Foreign Application Priority Data
Jan. 26, 2006 (EP) .................................. 06100874

(51) Int. Cl.
G06F 7/00 (2006.01)
G06F 17/30 (2006.01)
G06F 12/00 (2006.01)
(52) U.S. Cl. ......................................... 707/1; 707/200
(58) Field of Classification Search ...................... 707/1, 707/200
See application file for complete search history.

(56) References Cited

U.S. PATENT DOCUMENTS

| | | | |
|---|---|---|---|
| 6,249,755 B1 * | 6/2001 | Yemini et al. ................ | 702/183 |
| 6,330,564 B1 * | 12/2001 | Hellerstein et al. ........... | 707/101 |
| 6,484,179 B1 * | 11/2002 | Roccaforte ................... | 707/102 |
| 2003/0225768 A1 * | 12/2003 | Chaudhuri et al. ............. | 707/10 |
| 2004/0215626 A1 * | 10/2004 | Colossi et al. ............... | 707/100 |
| 2004/0243607 A1 * | 12/2004 | Tummalapalli .............. | 707/100 |
| 2005/0055673 A1 * | 3/2005 | Dias et al. .................... | 717/127 |
| 2005/0086195 A1 * | 4/2005 | Tan et al. ........................ | 707/1 |
| 2005/0086263 A1 * | 4/2005 | Ngai et al. ............... | 707/104.1 |
| 2005/0216490 A1 * | 9/2005 | Dias et al. .................... | 707/100 |
| 2006/0059205 A1 * | 3/2006 | Shah et al. ................... | 707/200 |

* cited by examiner

*Primary Examiner*—James Trujillo
*Assistant Examiner*—Jeffrey A Burke
(74) *Attorney, Agent, or Firm*—Mollborn Patents, Inc.; Fredrik Mollborn

(57) ABSTRACT

Methods and systems, including computer program products, for monitoring and analyzing a database performance problem stored in a separate performance database with cube-based analysis program tools. The methods and systems include means for detecting one or more performance problems, mapping performance problems to cubes, filling the cubes with performance data collected before, and outputting the filled cubes to an output interface usable to deploy said cubes for cube-based database performance analysis.

14 Claims, 13 Drawing Sheets

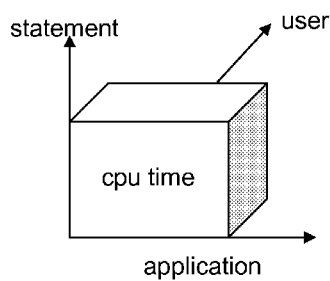
FIG. 3A
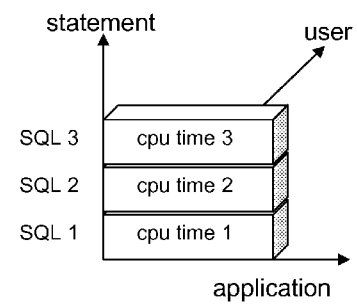
FIG. 3B
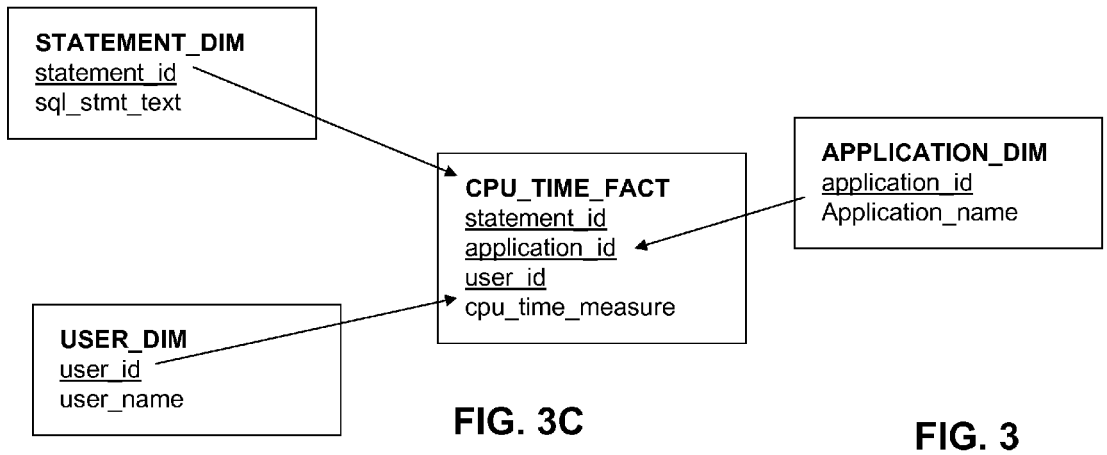
FIG. 3C
FIG. 3

AUTOMATIC PROBLEM-ORIENTED TRANSFORMATION OF DATABASE PERFORMANCE DATA

1. BACKGROUND OF THE INVENTION

1.1. Field of the Invention

The present invention relates to electronic databases. In particular, it relates to a method and respective system for monitoring and analyzing a database performance problem with multi dimensional database models.

1.2. Description and Disadvantages of Prior Art

FIG. 1 illustrates a prior art system architecture with the basic functional and structural elements for monitoring and analyzing a database performance problem.

A rectangle represents a component of a database performance monitoring environment. An arrow illustrates the flow of information between system components and within a system component respectively; a database and a data store in general is represented by a cake symbol.

A database management system (DBMS) 101 manages one or more (N) databases. Both the database management system itself and each individual database (DB) can be considered as a monitoring object with respect to database performance monitoring.

A database management system has an instrumentation interface 102. The instrumentation interface enables database performance monitoring tools to access current performance metrics, for example performance counters, DBMS configuration parameters or DB configuration parameters in a standardized manner.

A database performance monitor 103 retrieves current performance metrics using the instrumentation interface. Once the performance metrics are retrieved they can be accessed by all components of the database performance monitor for further processing. The database performance monitor stores the performance metrics including derived performance metrics, like for example an average response time of SQL statements in the last week, in a performance database 104. Depending on how up-to-date the performance data is, one distinguishes a short-term and a long-term performance database:

The performance monitor stores the performance metrics in the short-term performance database after retrieving them via the instrumentation interface. The performance data is stored in the short-term performance database for a user-defined time interval, e.g., 48 hours. When the user defined time interval is reached the performance data is deleted from the short-term performance database.

The short term performance data is transferred to the long term performance database on a regular basis. The schedule of this transfer process can be defined by the user, e.g., every hour new short term performance data is transferred to the long-term performance database. The short-term performance data is aggregated during the transfer to the long-term performance database. Depending on the type of the performance data the aggregation consists of calculations like interval processing, average calculation, delta processing, etc.

An exception processing component 105 facilitates the performance data in the short term performance database to perform checks of individual performance metrics against user-defined metric thresholds on a regular basis. If a performance metric exceeds (or falls below) a user-defined threshold, a respective threshold exception is generated and logged in the exception log. The logging of a threshold exception can optionally trigger a user defined action, e.g., the notification of a database administrator (DBA) via email.

A workflow engine 106 is responsible for executing tasks stored in a workflow task database 107 on a scheduled basis. The following tasks are usually initiated by the workflow engine 106:

The retrieval of the performance metrics of the monitored object via the instrumentation interface, the removal of the out-dated performance data from the short-term performance database, the transfer—including aggregation—of the short term performance data to the long term performance database, check of regular exception processing, and user-defined, repetitive tuning tasks, e.g., the generation of performance reports based on performance data stored in the long term performance database.

Usually a performance database is based on a classic relational database model. As to prior art, experienced database administrators (DBA) use performance databases to predict performance trends and to perform retrospective performance problem determination. A DBA can analyze current performance problems or performance problems of the past using the performance data that is stored in the performance database.

The information stored in performance databases is mainly analyzed using SQL queries in combination with tools that enable users to manage SQL queries.

Not all current performance monitoring tools support the administration of SQL queries accessing the performance database.

While relational database models are able to store huge amounts of data efficiently and without redundancy they tend to have a large number of tables to comply with normal forms defined by Codd. Besides relational data, models usually model the application domain and are not problem-specific. Both characteristics make it hard for SQL query authors to explore the data interactively for problem determination, as the logical coupling between redundancy-free storage and problem-specific storage is not stored and ready for being processed by a program.

2. SUMMARY OF THE INVENTION

In general, in one aspect, the invention provides methods and apparatus, including computer program products, implementing and using techniques for monitoring and analyzing database performance problems under usage of an interface to a database performance database storing performance data collected during runtime of the database in a redundancy-free form. The performance data is extracted from the performance database and transformed into a problem-specific form specific for a query formulated by a database administrator for detecting a respective individual database performance problem. The query uses multi-dimensional cubes and is based on a logic coupling between the redundancy-free and the problem-specific form.

A problem-cube model is stored, which implements the logic coupling and includes information on the mapping relationships between a database performance problem and a respective cube or one or more cube sets appropriate for a problem analysis of a respective performance problem. In response to detecting a specific performance problem, the cubes are automatically filled with respective performance data from the performance database by exploiting the implemented logic coupling. The filled cubes are output to an output interface usable to deploy the filled cubes for cube-based database performance analysis.

Advantageous implementations can include one or more of the following features. A performance problem can be automatically detected by detecting from an exception processing whether a predefined performance metrics threshold is exceeded. An initial interactive training mode can be provided, wherein performance problems can be identified, the mappings can be created and the cubes can be filled, in order to enable a notification component to trigger and invoke a cube advisor engine component to perform the filling and outputting.

A subsequently applicable autonomous mode can be provided wherein cubes can be automatically created and filled with actual performance data. Feedback information can be processed from a user as to whether a mapping between a given cube and a given problem was assessed successful by the user, and a rank information associated with the mapping can be increased in case of a successful mapping. Knowledge can be stored about performance problems in a hierarchic structure, and the hierarchic structure can be stored in a knowledge base.

A user can be enabled to store a new cube, and a user can be enabled to associate the new cube with an existing performance problem in the hierarchic structure. A set of cubes can be associated with a performance problem, and a first cube of the set can be used to determine the category of a performance problem, and a second cube can be used to determine the cause of the problem with the problem category. An existing exception processing can be used to trigger the detection of a performance problem.

A performance problem hierarchy validation can be performed. A user can be enabled to select one or more cubes or one or more cube sets for analysis of a detected performance problem. The output interface can be arranged to comply with a problem determination algorithm implemented by a computer program. The current state of the database can be validated and a list of database performance problems can be generated based on existing symptoms.

The details of one or more embodiments of the invention are set forth in the accompanying drawings and the description below. Other features and advantages of the invention will be apparent from the description and drawings, and from the claims.

3. BRIEF DESCRIPTION OF THE DRAWINGS

The present invention is illustrated by way of example and is not limited by the shape of the figures of the drawings in which:

FIG. 3A is a schematic illustration representing a cube that shows the overall CPU time consumption for all statements, applications and users;

FIG. 3B is a schematic illustration of the cube after a drilldown that shows the CPU time consumption of individual SQL statements for all applications and users;

FIG. 3C is a schematic illustration outlining the implementation of the cube in a database performance cube database, wherein a rectangular represents a table with table name in bold, primary key attributes are underlined, and an arrow represents a foreign key relationship;

It should be noted that all entity-relationship models used in the present disclosure have the sole purpose to describe what kind of informational entities are necessary to implement the invention and what kind of relationships exist between these information entities. Thus, and in order to increase clarity, only a minimum set of attributes and relations are listed for each entity.

4. DETAILED DESCRIPTION

Figure 1:
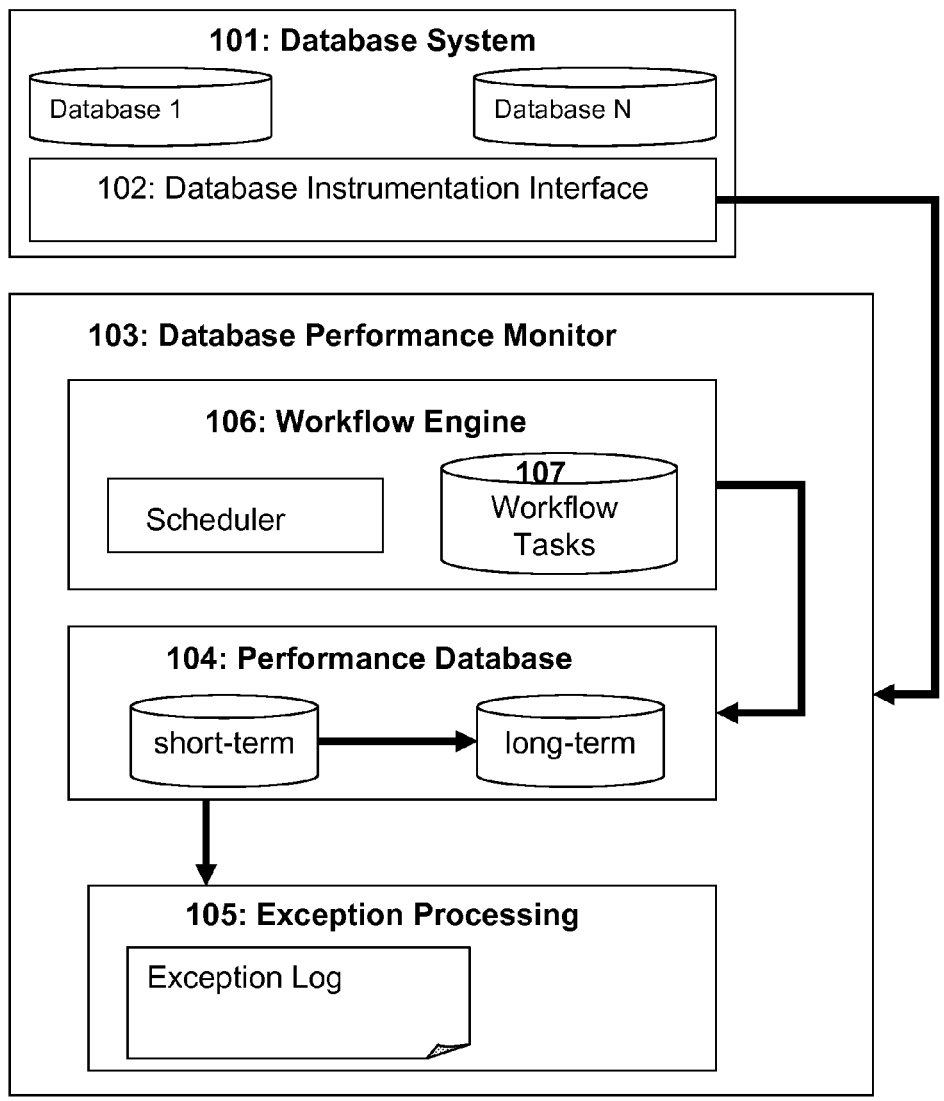
FIG. 1 is a schematic block diagram illustrating the system structure of a prior art database performance monitoring tool.
Figure 10:
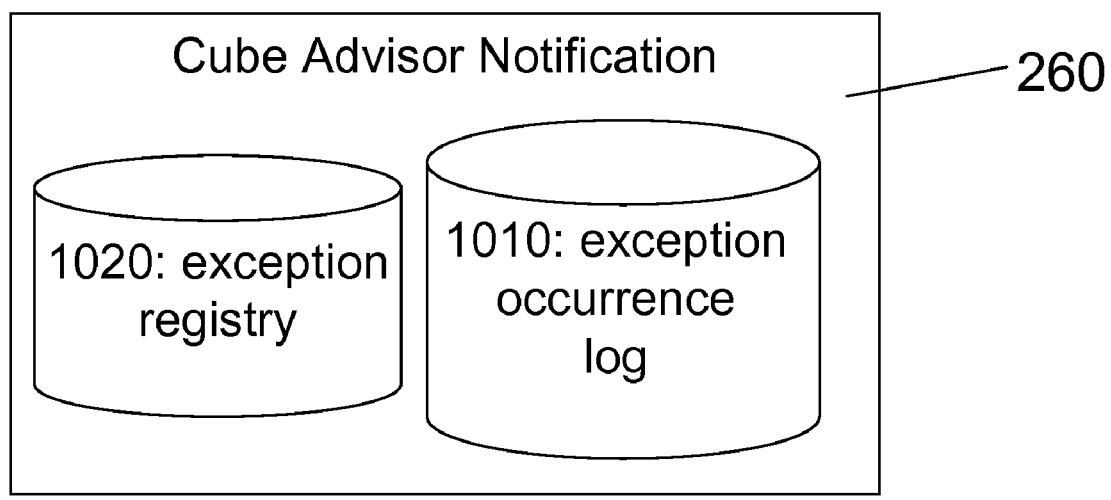
FIG. 10 is a schematic illustration of the system structure of a cube advisor notification component used in accordance with various embodiments of the invention.

With general reference to the figures and with special reference now to FIG. 2, an embodiment in accordance with the invention will be described. The system architecture of prior art FIG. 1 system is enriched by the following components:

A Performance Cube Advisor component 200, a Database Performance Cube Database 250, a Cube Advisor Engine 210, a Database Performance Cube Knowledge Base 220, a Knowledge Base Administration Module 230, a Cube Advisor Notification component 260, an exception processing component 205 comprising in turn an exception registry 1020 and an exception occurrence log 1010 (see FIG. 10). All other components correspond basically to the components described above with respect to prior art.

According to this invention and in contrast to the short-term and long-term performance database the database performance cube database 250 uses multi dimensional database models to store performance data. Examples of multi dimensional database models are prior art "star scheme" or "snowflake scheme". Multi dimensional database models are easier to understand and are problem-specific and thus problem-oriented. This feature simplifies for a DBA to create SQL queries to perform performance problem analysis.

Moreover, analysis tools with graphical user interfaces are available in prior art and enable end users to analyze multi-dimensional data models interactively performing drilldowns and rollups.

According to the method, for analyzing an individual performance problem an appropriate cube or cube set, referred to herein as multidimensional database model, is created in the database performance cube database 250 and is fed, i.e., filled with performance data extracted from the short-term and long-term performance database. The feeding of the database performance cube includes a transformation of the performance data. This procedure is called in general prior art an "ETL" process (Extract-Transform-Load).

In some embodiments, the database performance cube database 250 is implemented using a relational database. By that, the short term, long term and database performance cube database 250 can be managed by the same relational database management system (RDBMS) 101.

Due to the fact that the database performance cube database 250 is implemented using a relation database the cubes are also implemented using relational tables.

In some embodiments, cubes are implemented using the star schema. A star schema is built-up of two different types of tables, namely, a very large fact table containing the primary information of interest, i.e., performance measurements, and an arbitrary number of smaller dimension tables, each of which contains information about entries for a particular attribute in the fact table. The dimension tables categorize the facts in the fact table. A star-schema implementation is easy to understand for users and offers good query response time behavior.

FIG. 3A to 3C show an example of a cube that can be used to analyze performance problems of SQL statements.

In this example the cube can be used to analyze the CPU time consumption with respect to statements, users and applications. Performing cube operations like drilldown, slice and dice one can determine for instance the database user that consumes the most CPU time, or which SQL statement consumes the most CPU time.

The cube advisor engine 210 is operatively connected and programmed for creating and populating the cubes in the database performance cube database 250.

With reference back to FIG. 2 the database performance cube advisor component 200 comprises at least a database performance cube knowledge base 220, a cube advisor engine 210, and a knowledge base administration module 230.

In some embodiments, the database performance cube knowledge base 220 is implemented using a relational database. The short term, long term, database performance cube database and database performance cube knowledge base can thus be managed by the same relational database management system (RDBMS).

The database performance cube knowledge base 220 comprises and manages all information needed by the cube advisor engine 210. This information comprises in particular the following:
1. Cube Meta Model: This model comprises meta information about available multidimensional performance cubes such as fact tables, dimension tables, and relationship between fact and dimension tables.
2. ETL Meta model: This model comprises the knowledge about how to populate the performance cubes from the relational performance database.
3. Performance Problem Model: This model comprises the known performance problems and the relationship between these problems.
4. Cube Model: This model comprises Information about all defined cubes and cube sets that can be used to analyze database performance problems.
5. Problem-cube model: This model comprises the relationship between database performance problems and associated cubes and set of cubes appropriate for the problem analysis.
6. Cube Usage History: This stores information about which cube was used how often in the past to analyze a certain performance problem. The cube usage history also contains information telling if the proposed deployment of cubes was helpful for the DBA to solve the performance problem.

The user of the performance cube advisor tool does not have to supply input for the cube meta model or the ETL meta model. This information is inherent knowledge of the performance cube advisor.

The performance problem model, the cube model and the problem-cube model can be customized by the user to reflect characteristics of the monitored database environment.

The cube usage history is modified by the user when running the performance cube advisor in interactive working mode.

With respect to above item 1 the cube meta model stores information about the structures of all possible cubes supported by the performance cube advisor.

Thus the model is comparable to the meta information repositories maintained by relational database management systems. Each relational database management system maintains information about the structure of stored objects like tables, views, etc.

Figure 4:
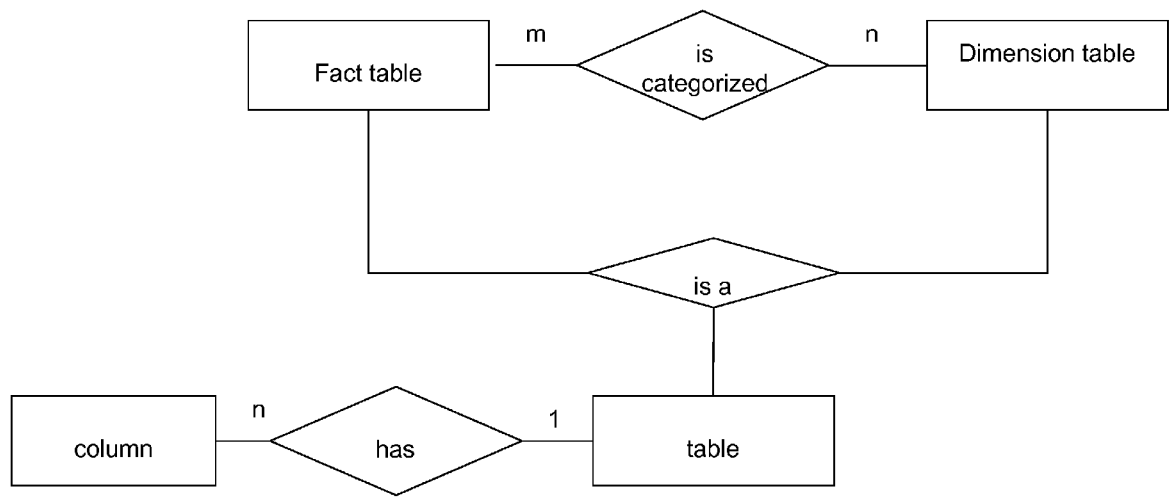
FIG. 4 is a schematic illustration of the entity relationship (ER) model of a cube meta model.

FIG. 4 shows the entity relationship (ER) model of the cube meta model. The entity "table" represents a table in a relational database model that represents either a fact table or a dimension table. Note that the structures of fact and dimension tables are identical. The name of the table is a key attribute thereof.

The "column" entity represents a table column in a relational database model. Note that columns in a fact table represent measurements (e.g., CPU time) and foreign keys to dimension tables, whereas columns in a dimension table represent dimension members (e.g., user names). The name of the columns is a key attribute, the data type attribute specifies the data type of the column.

This entity-relationship (ER) model can be used to derive a relational representation of the model that can be implemented using any relational database management system.

The cube meta model is used by the cube advisor to derive data definition language (DDL) SQL statements at runtime to create the cubes in the database performance cube database.

The cube meta model can not be modified by the user using the knowledge base administration module.

With respect to above item 2 the ETL meta model contains procedural knowledge and structural knowledge as different types of information.

The procedural knowledge determines how the fact and dimension tables are populated using the data stored in the performance database. This includes the type of operators (processing procedures) that need to be applied to the performance data in the performance database and the sequence in which these operators are applied. The ETL meta model also supplies implementations for the operators needed, i.e., executable computer programs.

The structural knowledge determines the type of performance data stored in the performance database, e.g., database configuration parameter, counter value, delta value, gauge value, high (low) watermark, etc.

A counter value is a performance metric that increases constantly starting at a defined reference point, e.g., the numbers of commits in a database system since the database start.

A delta value is calculated for two instances of a counter value, e.g., the number of commits in a database system between the times 14:00 and 14:30.

Moreover, information about dimension hierarchies is stored. Dimensions can be categorized themselves. For example the dimension time can be categorized in days, months and years. A single dimension can have multiple associated hierarchies.

With respect to database performance tuning the following dimension hierarchies are of interest:
    table->table space->buffer pool->database->instance
    time->day->month->year
    statement->application
    statement operation->statement->application It should be noted that the list above is not exhaustive and depends to some degree on the monitored database environment, as the database instrumentation interface and database architecture is vendor-specific.

The information needed by the ETL meta model can be stored in a relational database.

At runtime, according to one embodiment of the invention, the cube advisor engine 210 uses the ETL meta model to populate a database performance cube (cube set) in the database performance cube database.

The ETL meta model further offers an interface to third-party cube analysis tools. These tools can leverage the meta information stored in the model to support interactive drill-down and rollup using a graphical user interface.

The ETL meta model can not be modified by the user using the knowledge base administration module.

The implementation of the ETL meta model is based on prior art techniques.

With respect to above item 3 the performance problem model contains the description of all database performance problems that are recognized by the database performance cube advisor tool.

Database performance problems are represented by a set of symptoms. Each set contains at least one symptom.

A symptom is based on one of the following:
a database manager configuration parameter,
a database configuration parameter,
a performance counter of short-term or long-term performance database, In other words, a symptom is based on a performance metric stored in the performance database.

Each symptom is associated with a pathological value using a comparison operator, for example, "Buffer pool hit ratio"<80%.

Database performance problems can share common characteristics, i.e., one database performance problem can be a specialization of another database problem. Thus database performance problems can be structured using hierarchies.

Using a hierarchy two concepts of inheritance and "Overwriting" are available:

As to inheritance, a performance problem P1 that is a specialization of a performance problem P0 inherits all symptoms associated with problem P0.

As to Overwriting, a performance problem P1 that is a specialization of a performance problem P0 can define an alternative threshold for the pathological value of a symptom associated with P0.

For example,
Problem P0 is associated with the symptom set:
Buffer Pool Hit Ratio<90%
Package Cache Hit Ratio<80%
P1 is a specialization of P0.
P1 is associated with the symptom set:
Average Transaction Elapsed Time<2 seconds
Package Cache Hit Ratio<90%
The complete set of symptoms associated with problem P1 is:
Buffer Pool Hit Ratio<90% (inherited)
Average Transaction Elapsed Time<2 Seconds
Package Cache Hit Ratio<90% (overwritten)

Figure 5:
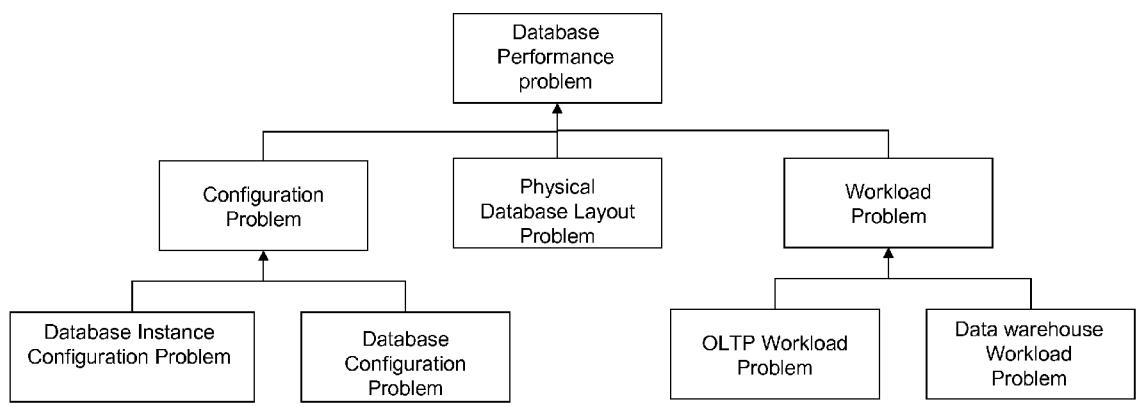
FIG. 5 is a schematic illustration of an exemplary problem hierarchy.

FIG. 5 shows an exemplary problem hierarchy:

The reason for a database performance problem can be a configuration problem, a problem concerning the applications accessing the database (database workload), or the physical database layout.

With respect to database workload problems one must distinguish between online transaction processing (OLTP), workload problems and data warehouse performance problems, etc.

Figure 6:
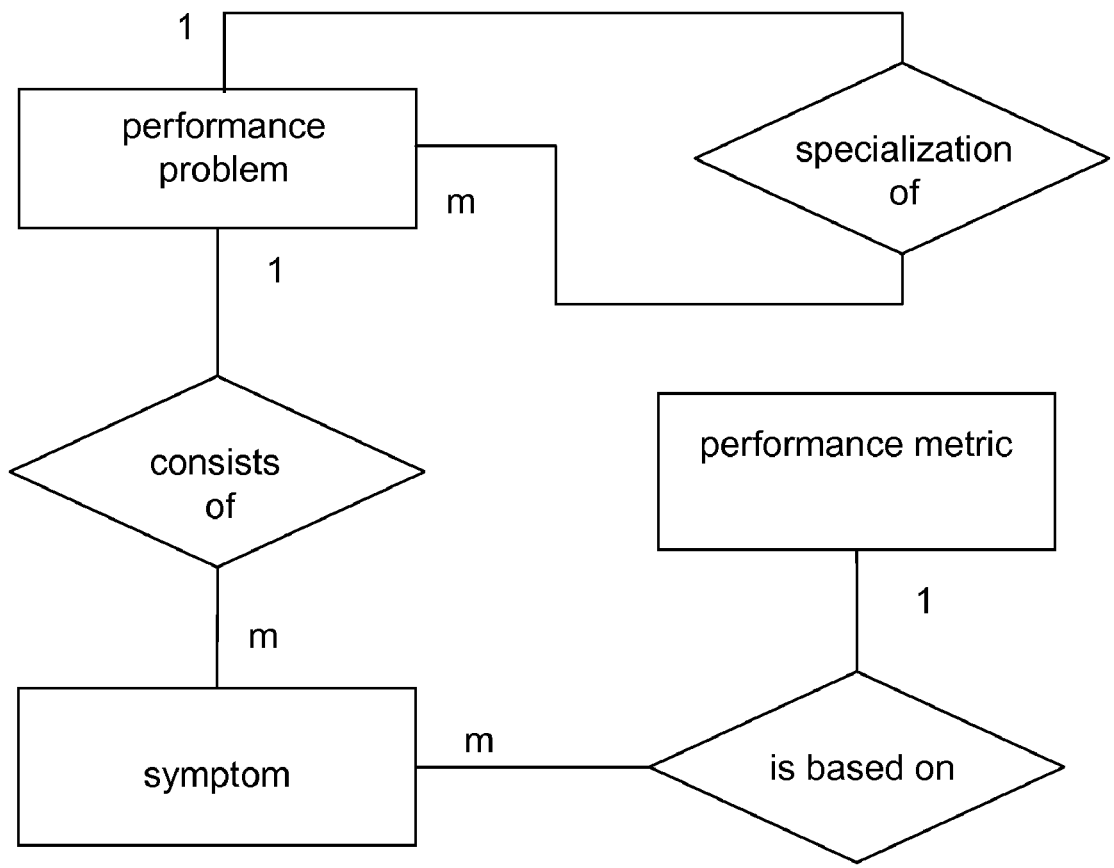
FIG. 6 is a schematic illustration of the entity relationship (ER) model of the performance problem model.

FIG. 6 shows the entity relationship (ER) model of the performance problem model. This ER model can be used to derive a relational representation of the model that can be implemented using any relational database management system.

The following tables list and describe the attributes of the entities in FIG. 6. In this respect the following metrics are used:

Number of times a cube was used: C (count);
Number of successful deployments of a cube to analyze a performance problem: SC (successful count);

Using both metrics one can calculate a derived metric named Cube Success Ratio as follows: CSR=SC/C, see also the ranking of cubes further below.

| Entity: Performance Problem This entity represents a database performance problem | | |
|---|---|---|
| Attribute | Key | Description |
| Identifier | Yes | A unique performance problem identifier, e.g., a problem name. |
| Parent identifier | | A unique performance problem identifier of the parent problem, i.e., the performance problem this entity is a specialization of (Foreign Key). |
| CSR Threshold | | This is the threshold for the CSR that is used in autonomic working mode. |
| CSR Error | | This is the threshold for the CSR error estimation used in autonomic working mode. |
| Schedule | | The default schedule used to schedule cube creation in autonomic mode. |

If a CSR of a cube or cube set exceeds the CSR threshold with an error estimation equal or lower then the specified CSR error then the cube or cube set is created by the cube advisor engine 210 in its autonomic working mode, as described below.

| Entity: Symptom This entity represents a symptom of a database performance problem | | |
|---|---|---|
| Attribute | Key | Description |
| Identifier | Yes | A unique symptom identifier, e.g., a symptom name. |
| Problem Identifier | | The identifier of the performance problem this symptom belongs to (Foreign Key). |
| Metric identifier | | The identifier of the performance metric this symptom is based on (Foreign Key). |
| Operator | | The operator, e.g., equal, greater then, etc. that is used to compare the current value of the symptom with the pathological threshold of the symptom. |
| Threshold | | This is the pathological value of the symptom. |
| Key Symptom | | This is a flag that indicates that this symptom is a key symptom for the performance problem this symptom |

| Entity: Symptom |||
| :--- | :--- | :--- |
| *This entity represents a symptom of a database performance problem* |||
| Attribute | Key | Description |
| | | belongs to. If a key symptom exists then the probability that the performance problem the symptom belongs to does exist is very high. |

| Entity: Performance Metric |||
| :--- | :--- | :--- |
| *This entity represents a database performance metric stored in the performance database.* |||
| Attribute | Key | Description |
| Identifier | Yes | A unique performance metric identifier, e.g., a metric name. |

The cube advisor engine 210 uses the performance problem model to check the current state of the short-term and long-term database of performance database (104) for existing database performance problems.

The database performance cube knowledge base 220 contains a predefined performance problem hierarchy that the user can start working with. This problem hierarchy depends on the monitored database environment as the database system architecture and database instrumentation interface is vendor-specific.

The performance problem model can be modified by the user using the knowledge base administration module 230. The following use cases are proposed by this embodiment:

A Definition of new performance problems, and a modification of existing performance problems As to the definition of new performance problems the steps to be implemented in various embodiments for creating a new performance problem definition are proposed as follows:

1. The user starts the knowledge base administration module.
2. The user selects the performance problem model administration sub module.
3. The user starts the performance problem creation procedure.
4. The knowledge base administration module displays a list of available performance problems.
5. The user selects the performance problem that is specialized by the performance problem to create. If the performance problem is no specialization of an existing performance problem then the user selects the root problem of the performance hierarchy.
6. The user adds at least one symptom to the newly created performance problem specifying:
   a. Metric identifier
   b. Operator
   c. Threshold
   d. Key Symptom Flag
   e. Symptom name
7. The user saves the defined performance problem specifying a unique name, a CSR threshold and CSR error.

As to a modification of existing performance problems the steps to modify a new performance problem definition are proposed as follows:

1. The user starts the knowledge base administration module.
2. The user selects the performance problem model administration sub module.
3. The user starts the performance problem modification procedure.
4. The knowledge base administration module displays a list of available performance problems.
5. The user selects the performance problem.
6. The user performs at least one of the following operations:
   a. Adding a new symptom to the performance problem.
   b. Deleting a symptom of the performance problem.
   c. Modifying the operator, threshold or key symptom flag of a symptom.
   d. Modifying the CSR threshold or CSR error.
7. The user saves the modified performance problem.

Exceptions of these rules are recommended to be considered at step 6.b, and step 7:

If the user deletes all symptoms of the performance problem it is not possible to save the modified performance problem.

Using the knowledge base administration module 230 the user can also associate cubes and cube sets with performance problems in the problem hierarchy. The association can be performed during creation or modification of a performance problem. Information about existing problem cube associations is stored in the problem-cube model.

With respect to above item 4 above, the cube model stores information about all defined cubes and cube sets. The database performance cube knowledge base 220 contains a set of predefined cubes the user can start working with. The set of predefined cubes depend on the monitored database environment as again database system architecture and database instrumentation interface are vendor-specific.

Figure 7:
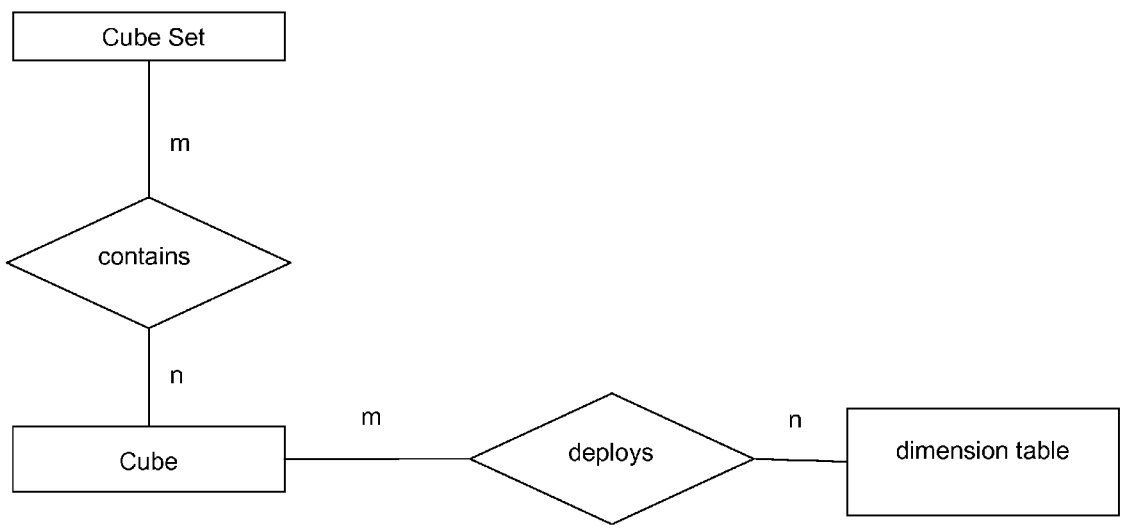
FIG. 7 is a schematic illustration of the entity relationship (ER) model of the cube model.

FIG. 7 shows the entity relationship (ER) model of the cube model. This ER model can be used to derive a relational representation of the model that can be implemented using any relational database management system. The properties of the entity relationship model are described by way of the following table:

| Entity: Cube Set |||
| :--- | :--- | :--- |
| *This entity represents the definition of a cube set.* |||
| Attribute | Key | Description |
| Identifier | Yes | The unique cube set identifier, e.g., a cube set name. |

| Entity: Cube |||
| :--- | :--- | :--- |
| *This entity represents the definition of a cube.* |||
| Attribute | Key | Description |
| Identifier | Yes | The unique identifier of the cube set, e.g., a cube name. |
| Fact Table | — | The name of an existing fact table the cube is based on. |

Each cube can use only dimension tables that can categorize the fact table that the cube is based on. This can be verified using the information stored in the cube meta model reflecting the relationship between fact table and dimension tables.

The cube model can be customized by the user. Here, the use cases of creation of a new cube and the modification of an existing cube should be distinguished.

It should be noted that the user cannot create cube sets manually. Sets of cubes are automatically created during the preceding interactive usage of the method database performance cube advisor tool in accordance with various embodiments of the invention.

The knowledge base administration module 230 provides an interface to the user in order to perform these use cases.

1. Creation of New Cube

The following steps create a new cube definition:
1. The user starts the knowledge base administration module 230.
2. The user selects the cube model administration sub module.
3. The user starts the cube creation procedure.
4. The knowledge base administration module displays a list of available fact tables.
5. The user selects a fact table.
6. The knowledge base administration module displays a list of dimension tables associated with the fact table selected in step 4.
7. The user selects at least two dimension tables.
8. The user saves the defined cube specifying a unique name.

Exceptions are to be considered at step 8:

If the user has already defined a cube with the same structure in the past, then an error message is displayed to the user and the cube definition is not saved. It should be noted that each cube definition must be unique.

2. Modification of an Existing Cube

The following steps modify an existing cube:
1. The user starts the knowledge base administration module.
2. The user selects the cube model administration sub module.
3. The user starts the cube modification procedure.
4. The user decides to add an additional dimension to the cube.
5. The knowledge base administration module displays a list of dimension tables associated with the fact table of the cube that has not been associated yet.
6. The user selects one or more dimension tables to add.
7. The user saves the modified cube definition using a new unique name.

Exceptions are to be considered at Step 7:

If the user has already defined a cube with the same structure in the past, then an error message is displayed to the user and the cube definition is not saved.

At step 4 the following alternative exists:
1. The user decides to delete an already associated dimension table.
2. The knowledge base administration module displays the list of already associated dimension tables.
3. The user selects one or more dimension tables to delete.
4. The knowledge base administration module checks if the cube definition contains at least two dimension tables.
5. The user saves the modified cube definition using a new unique name.

Exceptions are to be considered at step 4:

If the cube definition contains fewer than two dimension tables, then an error message is displayed to the user and the cube definition is not saved.

At Step 5:

If the user has already defined a cube with the same structure in the past, then an error message is displayed to the user and the cube definition is not saved.

Figure 8:
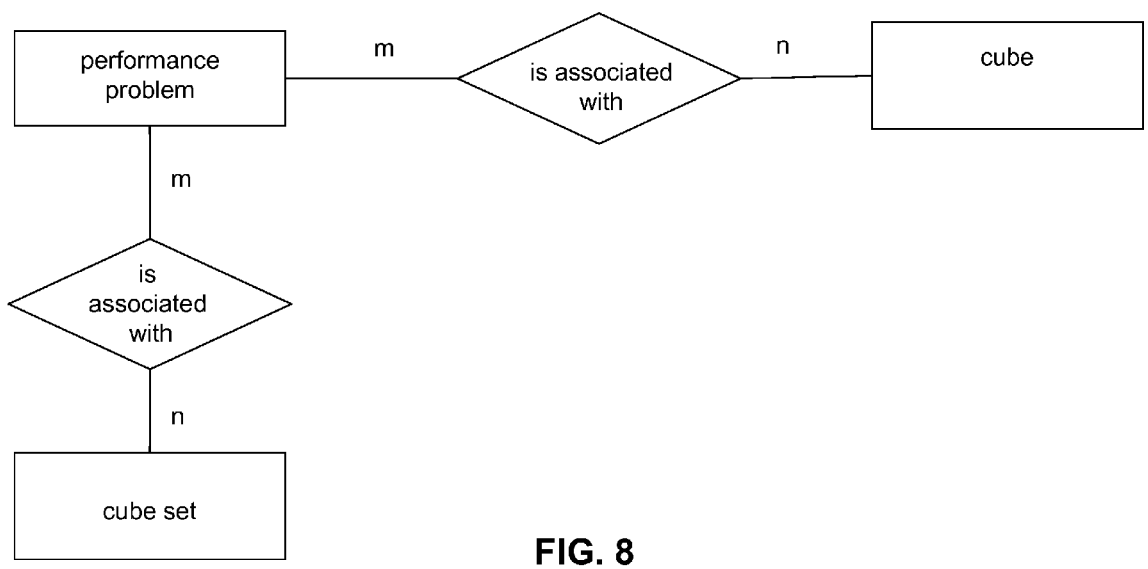
FIG. 8 is a schematic illustration of the entity relationship (ER) model of the problem-cube model.

With respect to above item 5, FIG. 8 shows the entity relationship (ER) model of the problem-cube model. This ER model can be used to derive a relational representation of the model that can be implemented using any relational database management system.

The analysis of database performance problems using multi dimensional database models is a highly interactive and to some degree intuitive process. A DBA performing a problem analysis using the method needs different types of cubes:

First, cubes to figure out the general problem area, e.g., database workload, database configuration, etc., and second, cubes to drilldown to the problem cause.

This circumstance is addressed according to this embodiment by the fact that in some embodiments of the invention, the method can associate a set of cubes with an individual performance problem.

The attribute description of the entities displayed in FIG. 8 can be found in the sections above related to performance problem model and performance problem entity, see FIG. 6, and cube model, see cube entity, cube set entity in FIG. 7, respectively.

With respect to above item 6, the cube usage history stores the following information:
1. What kinds of database performance problems are analyzed,
2. Which multidimensional database models are used to perform a particular problem analysis,
3. How often a cube or cube set is used to analyze a particular performance problem and if the cube usage was successful or not. In some embodiments, this is input by the user as feedback information as it is assessed by an experienced user personally.

Figure 9:
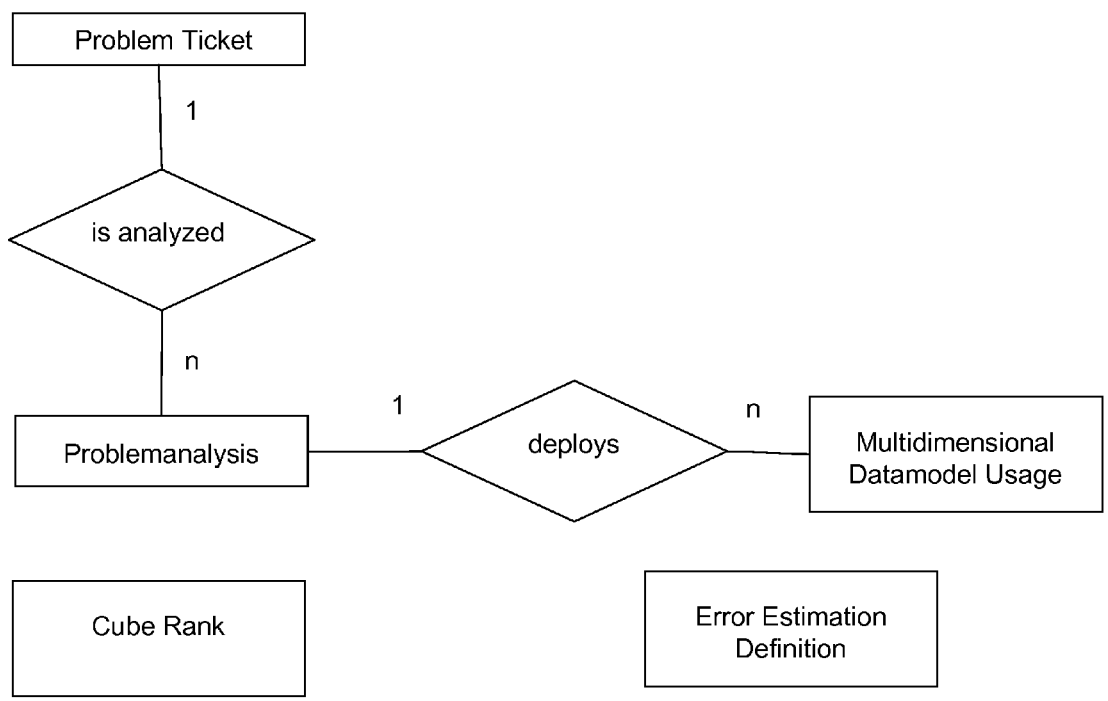
FIG. 9 is a schematic illustration of the entity relationship (ER) model of the cube usage history.

FIG. 9 shows the entity relationship (ER) model of the cube usage history. This ER model can be used to derive a relational representation of the model that can be implemented using any relational database management system.

The following tables list and describe the attributes of the entities in FIG. 9.

| Entity: Problem Ticket This entity represents a database performance problem ticket record. | | |
|---|---|---|
| Attribute | Key | Description |
| ID | Yes | A unique ticket ID. |
| Timestamp | — | The time and date a database performance problem is detected or reported. |
| Description | — | A verbal description of the database performance problem, e.g., database applications used by sales department is very slow. |

| Entity: Problem Analysis This entity represents a database performance problem analysis record. | | |
|---|---|---|
| Attribute | Key | Description |
| Container | — | The unique name of a container in the database performance cube database that holds the cubes used for problem analysis. How a cube container is implemented depends on the RDBMS used to manager the database performance cube database, e.g., DB2: schema Oracle: user |
| Time Interval | — | The time interval of the performance data stored in the performance database used to feed the cubes. |
| Schedule | — | The schedule of the cube creation and population, e.g., immediately or a particular point in time. |
| Problem Identifier | | The unique identifier of the problem that is analyzed. (Foreign key) |

| Entity: Multidimensional Data model Usage This entity represents a multidimensional model (MDM) usage record. A MDM usage record documents the deployment of particular cubes or cube sets for problem analysis. | | |
|---|---|---|
| Attribute | Key | Description |
| MDM Type | — | The type of usage: Cube usage Cube set usage |
| MDM Identifier | | Depending on the type of usage: Cube identifier Cube set identifier |
| Success | | Flag indicating if usage of MDM leads to a successful analysis of the performance problem. |

| Entity: Cube Rank This entity represents the rank of a cube or cube set with respect to a particular database performance problem. | | |
|---|---|---|
| Attribute | Key | Description |
| Problem ID | Yes | The unique id of the problem that is analyzed. (Foreign key) |
| MDM Type | Yes | The type of multidimensional data model: Cube usage Cube set usage |
| MDM Identifier | Yes | Depending on the type of usage: Cube identifier Cube set identifier |
| Count | | Number of times a MDM is used |
| Successful Count | | Number of successful deployment of a cube to analyze a performance problem |

| Entity: Error estimation definition This entity represents the definition or error categories. | | |
|---|---|---|
| Attribute | Key | Description |
| Error Category | Yes | A unique error category name |
| Min | | Lower boundary of cube (set) usage. |
| Max | | Upper boundary of cube (set) usage. |

The cube rank entity is used to rank cube proposals made by the cube advisor tool and thus implements some kind of learning mechanism. To rank the cube proposals the following metrics are used:

Number of times a cube was used: C (count)

Number of successful deployment of a cube to analyze a performance problem: SC (successful count)

Using both metrics one can calculate a derived metric named Cube Success Ratio as follows: CSR=SC/C.

In some embodiments, the CSR is used to rank cube proposals. The CSR is the probability that a cube proposal leads to a successful analysis of a database performance problem. The re-ranking of cube proposals based on problem determination success leads to a customer specific Cube Advisor.

In some embodiments, each CSR is associated with one of the following categories of error estimations: low error, medium error, high error or very high error. This or similar error estimation is used to provide a kind of confidence measure for the CSR. The error estimation depends on the number of times a cube or cube set was deployed to analyze a certain problem.

For example, an error estimation definition is given as follows:

Very high: cube is deployed<=10 times

High: cube is deployed between 11 and 20 times

Medium: cube is deployed between 21 and 30 times

Low: cube is deployed>=31 times

If a user deploys cube C1 to analyze a problem P 40 times and the user is successful 10 times, then the CSR is 25% ($^{10}/_{40}=\frac{1}{4}$) and the estimated error is low.

If a user deploys cube C2 to analyze a problem P 10 times and the user is successful 5 times the CSR is 50% ($^{5}/_{10}=\frac{1}{2}$) and the estimated error is very high.

In some embodiments, every time the CSR is displayed to the user the associated error estimation is also displayed in order to give him additional information how to assess the result.

The knowledge base administration module 230 can be used to manage the error estimation definition, i.e., to specify new boundaries for individual error estimation categories. The knowledge base administration module verifies if boundaries specified by the user make sense.

Figure 2:
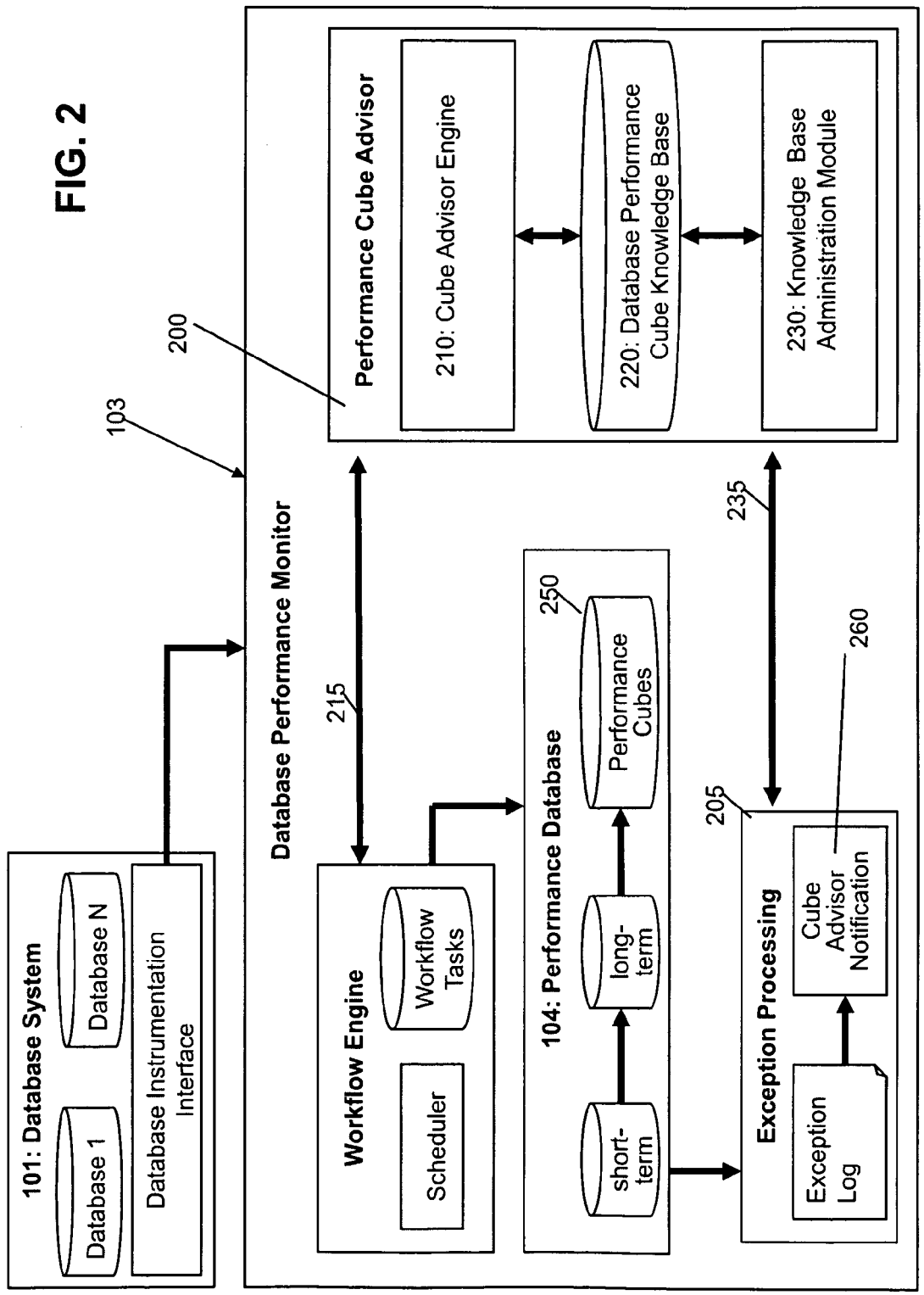
FIG. 2 is a depiction according to FIG. 1, enriched by components in accordance with various embodiments of the invention.

With further reference to FIG. 2, component 210, the cube advisor engine 210 implements the following tasks:

Validation of the current state of the performance database, checking if any database performance problems exist;

Creation of set of cubes in the database performance cube database that can be used for problem determination; and Feeding of the set of cubes with the appropriate performance data retrieved from the short and long term performance database.

The information needed by the cube advisor engine component 210 to perform the actions described above is stored in the database performance cube knowledge base 220.

As to the validation of the current state of the performance database, this state is validated both in interactive working mode and in autonomic working mode of the method.

In some embodiments, in interactive working mode the validation is triggered on a user request. The cube advisor engine 210 traverses the performance problem hierarchy using a "breadth first" strategy as follows:
1. The cube advisor engine adds the performance problems of the first hierarchy level to the list P of problems $p_i$.
2. Loop overall problems $p_i$ in list P is performed:
   a. Determine the set of symptoms S of problem $p_i$
   b. For each symptom $S_j$ in set S the symptom threshold is compared with the current symptom value stored in the performance database.
      If all predicates defined by symptoms $S_j$ evaluate to TRUE
      do:
         i. add the tuple ($p_i$,all) to the set of existing problems EP;
         ii. add all direct successors of $P_i$ in the problem hierarchy to the end of list of problems P;
      else: add the tuple ($p_i$, count) to the set of existing problems EP with a variable "count" being the number of existing symptoms.
3. Create a sorted problem list PL from the set of tuples EP using the second element as order criteria.

A list PL starts with existing performance problems.

In some embodiments, the validation in autonomic working mode is done according to the following control flow:
1. The cube advisor engine gets the following information from the cube advisor notification component:
   a. The type of the exception occurred, i.e., the performance metric the exception is based on;
   b. The value of the exception threshold;
   c. The comparison operator;
   d. The timestamp of the exception occurrence;
   e. The database instance the exception occurred in;
   f. The database the exception occurred in.
2. The cube advisor engine determines the symptoms that are based on the performance metric of the exception occurred and that are flagged as key symptoms. This leads to a set of key symptoms KS.
3. The performance problems associated with the key symptoms in the set KS are determined. This leads to a list of key problems KP.
4. Then a loop is performed over all problems $P_i$ in list KP:
   a. The set of symptoms S of problem $P_i$ is determined. Note that the set of symptoms also includes the inherited symptoms which are not overwritten.
   b. For each symptom $S_j$ in set S compare the symptom threshold with the current symptom value stored in the performance database.
      If all predicates defined by symptoms $S_j$ evaluate to TRUE
         i. add the problem $p_i$ to the set of candidate problems CP for automatic cube generation
         ii. add all direct successors of $P_i$ in the problem hierarchy to the end of list of key problems KP.

The set CP contains all problems that are candidates for autonomic cube generation.

Next, the creation of cubes and cube sets in the database performance cube database will be described in more detail:

The information necessary for cube and cube set creation can be derived from the corresponding problem analysis records and the multidimensional model (MDM) usage records. The following sequence of steps is performed:

1. The cube container described in the problem analysis record is created.
   (SQL STATEMENT: CREATE SCHEMA or CREATE USER)
2. Then a loop over all MDM usage records is performed:
   a. If the usage record represents a cube set usage
      i. Do:
         add all cubes $c_j$ to the set of cubes C
      ii. Else:
         Add the cube to the set of cubes C
3. Then, a loop over all cubes $c_j$ in the set of cubes is performed comprising the following steps:
   a. retrieve the structure of the fact table ft of cube $c_j$ from the cube meta model;
   b. create the fact table ft;
      (SQL STATEMENT: CREATE TABLE)
   c. add a primary key $pk_j$ to the set of primary keys PK;
   d. determine the set of dimension tables SD of cube $c_j$ using the information stored in the cube model;
   e. Loop over all dimension tables $d_j$ in SD:
      i. Retrieve the structure of the dimension table d from the cube meta model;
      ii. Create the dimension table $d_j$
         (SQL STATEMENT: CREATE TABLE)
      iii. add a foreign key $fk_j$ to the set of foreign keys FK;
4. Next, the information stored in the ETL meta model is used to feed the created cubes.
5. Perform post processing
   a. Then a loop over set PK is done creating all primary keys. This includes an index creation.
      (SQL STATEMENT: ALTER TABLE)
   b. Then, a loop over set FK is performed for creating all foreign keys. This includes index creation.
      (SQL STATEMENT: ALTER TABLE)

Figure 13:
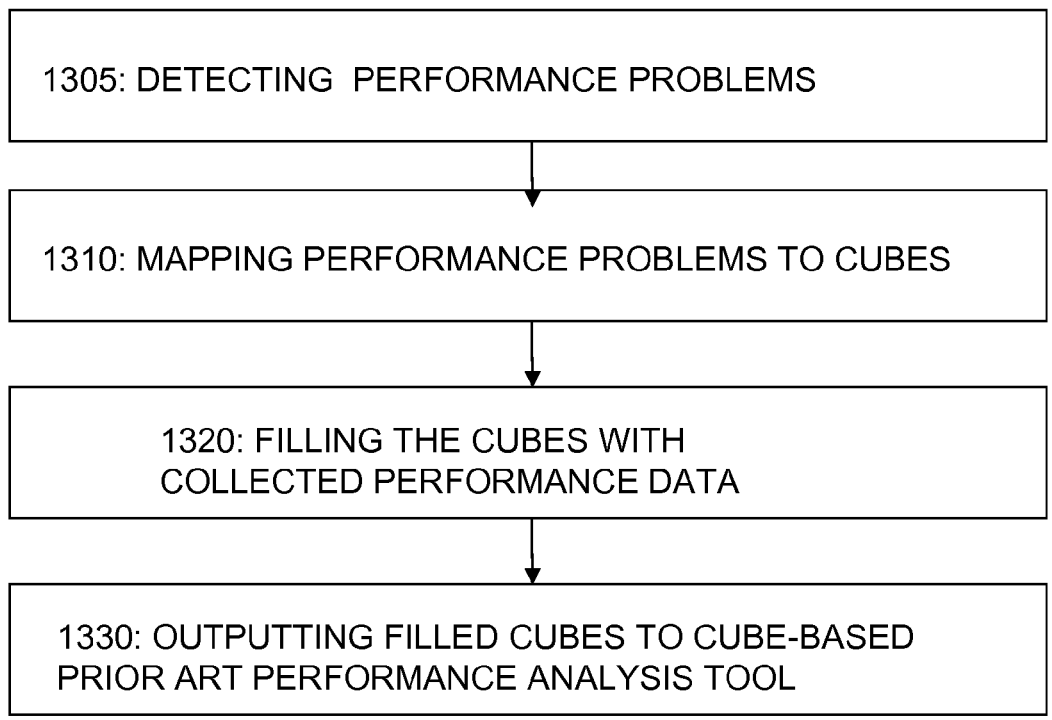
FIG. 13 is a schematic illustration of the control flow of the method in an overview form.

With respect to FIG. 13 the step 1320 of feeding and filling the cubes in the cube database 250 with data from the short-term/long-term performance database 104 the cube advisor engine 210 uses the information stored in the ETL meta model to determine the sequence of ETL operations that have to be performed to extract the performance data from the performance data base, to transform, i.e., to aggregate, and to load into the database performance cubes.

With reference to FIG. 2 again, the knowledge base administration module 230 is the main interface for administering the individual models stored in the database performance cube knowledge base 220. This component comprises the functionality for handling the problems stored in component 220 as described above.

With further reference to FIG. 2 the Cube Advisor Notification component 260 is described in more detail:

To create automatically database performance cubes in the performance cube database 250 when a database performance problem exists a link 235 between the exception processing component 205 and the performance cube advisor component 200 is established. The cube advisor notification component 260 implements this link.

The cube advisor notification component is configured by the user. In order to do that, a user must specify the type of exception occurrences that should trigger automatic performance cube creation and population, and to specify how often a certain type of exception must occur during an arbitrary time interval before an automatic performance cube creation should be triggered.

For example, the user can specify that a single occurrence of the exception "Buffer pool hit ratio <90%" should trigger the automatic performance cube creation, or that 10 occurrences of the exception "Buffer pool hit ratio <90%" during one hour should trigger automatic performance cube creation.

The architecture of the cube advisor notification component 260 is shown in FIG. 10. The cube advisor notification component 260 comprises as subcomponents an exception registry 1020, and an exception occurrence log 1010 (again a data store). The cube advisor notification component 260 stores the user specifications in this local exception registry 1020, i.e., a special data store. Moreover the cube advisor notification component 260 records the occurrence of configured exceptions of interest in the exception occurrence log 1010. The exception log depicted and described with reference to FIG. 1 still exists and is operated in parallel to any functional component provided by the invention, at least in case the method is implemented in a pure Add-On form for a prior art database performance monitoring tool. In some embodiments, the data stores 1010 and 1020 needed by the cube advisor notification component 260 are implemented as tables in a relational database.

Figure 11:
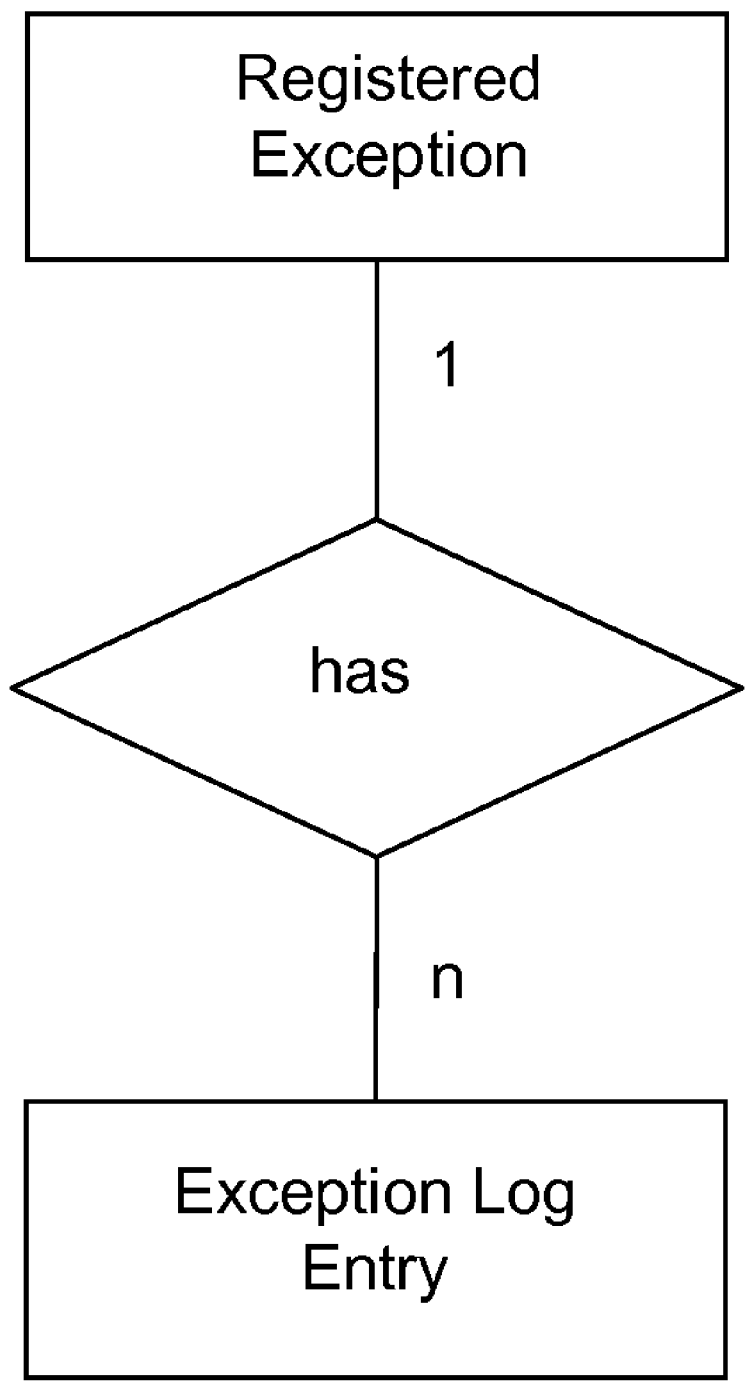
FIG. 11 is a schematic illustration of the entity relationship (ER) model of information used by the Cube Advisor Notification Component.

FIG. 11 represents an entity relationship (ER) model for the data the cube advisor notification component 260 must store persistently. This ER model can be used to derive a relational model that can be implemented using any relational database management system. The properties of the entity relationship model are described by way of the following table:

Entity: Registered Exception
This entity represents an exception registered in the exception registry

| Attribute | Key | Description |
|---|---|---|
| Metric | Yes | Performance metric the exception is based on. |
| Operator | Yes | The comparison operator used. |
| Threshold | Yes | The exception threshold. |
| Instance | Yes | The instance the exception occurred. |
| Database | Yes | The database the exception occurred. |
| Type | — | Single occurrence or multiple occurrence |
| Count | — | The number of times an exception must occur. (Relevant only for type multiple occurrence.) |
| Interval | — | The time interval used to calculate occurrence frequency. (Relevant only for type multiple occurrence.) |

Entity: Exception log entry
This entity represents an entry of an exception occurrence in the exception occurrence log.

| Attribute | Key | Description |
|---|---|---|
| Timestamp | — | The timestamp of an exception occurrence |
| Exception Identifier | — | The unique identifier of an registered exception. (Foreign Key) |

Figure 12:
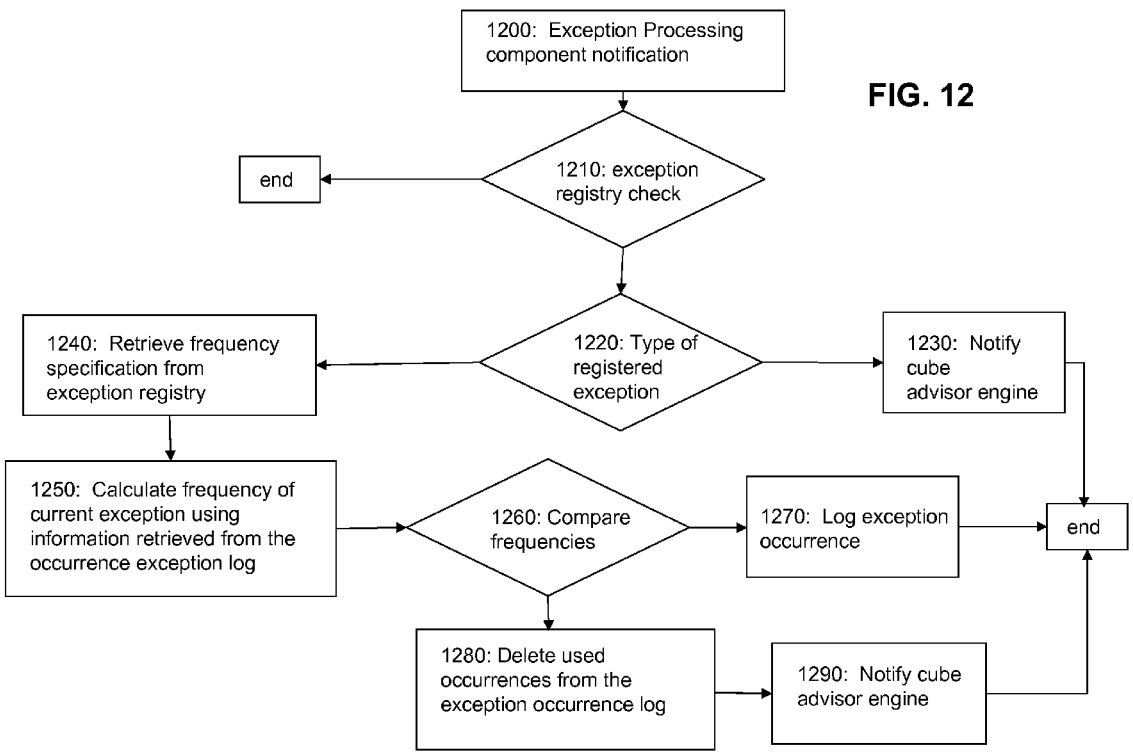
FIG. 12 is a schematic illustration of the control flow of the method, reduced to the control flow between a cube advisor notification component and a cube advisor component.

FIG. 12 outlines the main steps and the control flow describing how the cube advisor notification component 260 works:

Step 1200: If an exception occurrence is logged into the exception log of the exception processing component 205 the following information is sent to the cube advisor notification component 260:

The type of the exception occurred, i.e., the performance metric the exception is based on ("Buffer pool hit ratio"),
the value of the exception threshold. ("90%"),
the comparison operator ("<"),
the timestamp of the exception occurrence,
the database instance the exception occurred,
the database the exception occurred.

Step 1210: The cube advisor notification component checks the exception registry for the current exception occurrence, If the current exception type is not registered the algorithm ends and the control is fed back to process a new exception.

If the current exception type is already registered then in:

Step 1220: The cube advisor notification component determines the type of the registered exception, either single occurrence, or multiple occurrences.

Step 1230: In case of single occurrence, the cube advisor notification component passes all information received from the exception processing component to the cube advisor engine.

Step 1240: In case of multiple occurrences, the cube advisor notification component retrieves the specified occurrence count N and the time interval T from the exception registry 1020. The boundary for the exception frequency is calculated: $F=N/T$ Step 1250: After doing step 1240 the cube advisor notification component calculates the frequency of the current exception as follows:

Retrieve the number of exception occurrences for the type of interest n for the time interval $[(t-T),t]$ from the exception occurrence log. Note: t is the current exception timestamp. Calculate the current frequency as follows: $f=(n+1/T)$ Step 1260: After doing step 1250 the cube advisor notification component 260 compares the calculated frequency with the frequency boundary specified in the exception registry 1020.

Step 1270: If the calculated frequency is lower than the boundary specified then the cube advisor notification component logs the exception occurrence in the exception occurrence log. Then the control is fed back to step 1200.

Step 1280: If the calculated frequency is greater than or equal the boundary specified then the cube advisor notification component 260 deletes all exception occurrences used to calculate the current exception frequency from the exception occurrence log.

Step 1290: After step 1280 the cube advisor notification component passes all information received from the exception processing component to the cube advisor engine. Then the control is fed back to step 1200.

Next, two use cases or application modes will be described. The distinction between different application modes is based on the following considerations:

Finding the "right" analysis cube(s) is a highly non-trivial and possibly iterative, trial-and-error process that should be accomplished by experienced database administrator (DBA) staff. The "cube advisor" method can be regarded as a guide to simplify the deployment of multidimensional performance data for problem analysis.

In this respect, preferably initially, the DBA uses the method interactively thus performing some kind of training of the method. During the learning process (learning by example) the cube usage history in the knowledge base 220 is updated, i.e., the above-mentioned parameter CSR is recalculated.

Once performance problems are identified that can be analyzed using a certain cube set for sure, i.e., as soon as the CSR exceeds a probability threshold with a categorical error estimation accepted by the user, the method can be configured to create and populate the performance cubes automatically without user interaction. This is referred then by "autonomous mode."

The next section describes both use cases of the cube advisor tool implemented by the method including a description how the individual components of the database performance monitoring tool interact.

Use Case 1: Database Performance Cube Advisor Interactive Mode:

The interaction of the individual components used by the method is as follows:

1. The DBA detects a database performance problem, see step 1305 in FIG. 13. There are multiple ways the DBA can detect a database performance problem, e.g.,
   a. The DBA detects a threshold exception in the exception log.
   b. A database user calls the DBA and complains about decreased database performance.
2. The DBA starts the database performance cube advisor in interactive mode.
3. The database performance cube advisor tool retrieves the list of known database performance problems from the database performance cube knowledge base 220 using the performance problem model.
4. The database performance cube advisor tool displays the list of retrieved database performance problems.
5. The DBA selects a database performance problem from the list. There are two potential alternatives:
   a. The DBA has a hypothesis about what caused the database performance problem and selects the performance problem that is most appropriate to test his hypothesis.
   b. The DBA instructs the database performance cube advisor tool to validate the current state of the database. This results in a list of database performance problems ordered by the number of existing symptoms. The DBA chooses a database performance problem from the ordered list.
6. The database performance cube advisor tool retrieves the list of cubes and cube sets associated with the selected database performance problem from the database performance cube knowledge base 220, using the problem-cube model.
7. The database performance cube advisor tool retrieves information about the cube success ratio and the categorical error estimation for the cubes and cubes sets from the cube usage history.
8. The database performance cube advisor tool displays the list of cubes ordered by the cube success ratio and the categorical error estimation.
9. The DBA selects one or more cubes and cube sets for database performance analysis.
10. The DBA specifies a unique (ticket) identifier for database performance problem analysis:
    a. A new unique ticket identifier is used if the problem is analyzed the first time. This creates a ticket record in the cube usage history.
    b. The ticket identifier defined previously is used if the problem is analyzed again using different cubes and cube sets.
11. The DBA specifies the time interval of the performance data stored in the performance database which will be used to populate the cubes.
12. The DBA specifies a schedule for cube creation and population.
13. The database performance cube advisor tool creates the following records in the cube usage history which are associated with the ticket record selected in step 10:
    a. Problem analysis record
    b. Multidimensional data model (MDM) usage record for each cube or cube set specified in step 0
14. The database performance cube advisor tool creates a workflow task referencing the problem analysis record created in step 13 having the schedule defined in step 12.
15. The workflow engine starts the workflow task responsible for cube creation and population as scheduled in step 12.
16. The workflow task triggers the cube advisor engine to create and populate the cubes described in its associated problem analysis record.
17. The cube advisor engine 210 retrieves the structure description of the cubes specified in the problem analysis and MDM usage records from the cube model and the cube meta model.
18. The cube advisor engine 210 creates the cubes in the container specified in the problem analysis record.
19. The cube advisor engine populates the cubes with performance data from the performance database using information stored in the ETL meta model, see step 1320 in FIG. 13.
20. The DBA is notified by the method that the selected cubes are ready for analysis. There are several means to notify the DBA, e.g.,
    a. Email
    b. The database performance cube advisor tool pops up an information message.
21. The DBA uses a third-party prior art tool with a graphical user interface to interactively analyze the cube, see step 1330 in FIG. 13.
22. The DBA specifies which combination of cubes and cube sets lead to a successful analysis of the performance problem.
23. The database performance cube advisor tool re-computes the cube and cube set ranks and the categorical error estimation according to the user input of step 22.
24. The database performance cube advisor tool updates the cube usage records in the cube usage history as indicated by the mapping step 1310 in FIG. 13.
25. The DBA re-starts the procedure at step 4 or 6 if the performance problem is not successfully analyzed with the selected cubes or cube sets.

Some additional notes are given for step 23:

If the user specified several cubes, several cube sets or a combination of several cubes and several cube sets, then the cube set resulting from the union of the specified cubes is calculated and associated with the analyzed performance problem. If necessary the resulting cube set is created in the cube model.

Further, a MDM usage record for the resulting union cube set is created and associated with the current problem analysis. The MDM usage record indicates a successful analysis, whereas all other MDM usage records indicate no success by way of the attribute success.

The cube set resulting from the union gets an increase in the number of successful applications whereas all other cubes do not due to their cube rank.

This way the database performance cube advisor tool determines the optimum minimum set of cubes that can be used to analyze a database performance problem.

For example, if the user specifies that the cubes C1 and C2 together with the cube set CS1 containing cubes C3 and C4 lead to a successful performance problem analysis of problem P, then the resulting union cube set CS containing C1, C2, C3 and C4 is associated with the performance problem P and the corresponding cube rank entry is created or updated.

Use Case 2: Database Performance Cube Advisor Automatic/Autonomous Mode

This use case describes how the cube advisor tool works in automatic mode to support the analysis of a certain database performance problem.

Hereby, it is assumed that the DBA has already trained the cube advisor tool prior to enabling the cube advisor notification component 260 to trigger and invoke the cube advisor engine 210.

The interaction of the individual components of the database performance cube advisor tool implementing the method is described as follows:

1. The cube advisor notification component 260 notifies the cube advisor engine 210 that an exception occurred, see step 1305 in FIG. 13 and above section about cube advisor notification component 210 for details.
2. The cube advisor engine validates the current state of the performance database 220. The result of the validation is a set of problems CP that are candidates for an autonomic cube generation performed according to the invention, see section about the cube advisor engine 210 for details.
3. The cube advisor engine 210 creates a ticket record with the following values:
    a. ID: The cube advisor engine creates a unique ticket ID; b. Timestamp: The timestamp of the exception occurrence as reported by the cube advisor notification component;
    c. Description: All the notification information sent by the cube advisor notification component.
4. The cube advisor engine loops over all problems $P_i$ in CP:
    a. The cube advisor engine determines the set of the cubes and cube sets CS associated with $p_i$. It should be noted that a problem inherits all cubes and cube sets of its predecessors in the problem hierarchy.
    b. The cube advisor engine 210 creates a problem analysis record with the following values:
        i. Container: The cube advisor engine creates a unique container name.
        ii. Time Interval: Using the set of successful MDM usage records associated with problem $p_i$ an average time duration is calculated This can be done simply be determining the maximum time interval used for successful analysis. Another approach would be to create a sorted list of time intervals used for successful analysis; then a time interval is calculated that is greater than 80% (percentage value can be defined by the user) of the successful intervals used, but less than or equal to the maximum value. Using the timestamp specified in the problem ticket created in step 3 as reference point a time interval value is calculated.
        iii. Schedule: The default schedule of problem $p_i$ retrieved from the performance problem model.
        iv. Problem Identifier: The identifier of the problem $p_i$ retrieved from the performance problem model
    c. The cube advisor engine 210 loops over all $c_i$ in CS:
        i. The cube advisor engine determines the cube success ratio CSR and the categorical error estimation ERROR for cube (or cube set) $c_i$ and problem $p_i$ using the information stored in the cube usage history.
        ii. If the (CSR>=cube success ratio specified for $p_i$ and (ERROR<=error specified for $p_i$) then a MDM usage record for the cube is created in the cube usage history referencing the problem analysis record created in step 4b.
    d. The cube advisor engine 210 checks if the problem analysis record created in step 4b has referencing MDM usage records. If not, the cube advisor engine 210 deletes the ticket record and problem analysis record created in step 3b.
5. The cube advisor engine 210 creates a workflow task for each existing problem analysis record created in step 4, see the link 215 in FIG. 2.
6. The workflow engine 210 starts the workflow tasks responsible for cube creation and population as scheduled.
7. The workflow tasks trigger the cube advisor engine 210 to create and populate the cubes described in its associated problem analysis record.
8. The cube advisor engine 210 retrieves the structure description of the cubes specified in the problem analysis and MDM usage records from the cube model and the cube meta model.
9. The cube advisor engine 210 creates the cubes in the container specified in the problem analysis record.
10. The cube advisor engine populates the cubes with performance data from the performance database using information stored in the ETL meta model.
11. The DBA is notified that the selected cubes are ready for analysis.
12. The DBA uses a third-party tool with a graphical user interface to interactively analyze the cube.

The present invention can be realized in hardware, software, or a combination of hardware and software. A database performance monitoring/analyzing tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following
a) conversion to another language, code or notation;
b) reproduction in a different material form.

The basic steps outlined above (detect a problem, cube mapping, cube creation and filling, outputting to an output interface) essentially represent the first steps necessary to implement a fully autonomic database performance problem analysis. Various embodiments of the invention create multi-dimensional performance data that can be used by a problem determination algorithm to automatically determine the cause of the problem. As described, after cube creation the DBA is notified about the cube existence. Alternatively, instead of notifying a DBA a problem determination algorithm can be invoked to analyze the performance problem.

In some of the embodiments described above, an exception can trigger the cube advisor notification component, thus leading to a validation of the current state of the performance database. If a performance problem exists workflow tasks are created and scheduled that generate the cubes associated with the performance problems detected. The scheduled workflow task can in general perform an arbitrary action after a problem has been identified, e.g., generating a performance report.

The various embodiment of the invention simplify the deployment of multi dimensional performance data for problem analysis by providing a problem oriented ETL process that is transparent to the user:

The ETL process is transparent because the ETL processing is integrated in the database performance monitoring system described in the invention. Thus no user training is needed to deploy multidimensional performance data for problem analysis.

The ETL process is problem-oriented because for each detected performance problem different ETL processes are initiated.

Using multi dimensional performance data for problem analysis can speed up the analysis of performance problems because multidimensional data models are easier to understand.

Various embodiments of the invention simplify for a DBA to create SQL analysis/diagnosis queries and provides input to a variety of graphical prior art analysis tools to perform interactive drilldowns and rollups.

Some embodiments further allow exploration of performance data interactively, more reliably, even for inexperienced database administrators and thus speed up problem determination and minimize the time between problem occurrence and solution.

Some embodiments further automatically suggest and/or create system-specific multidimensional performance data models (on user request). They supply problem-specific and solution-specific re-structured short- and long-term performance data.

Some embodiments leverage knowledge about which cubes or cube sets are most suitable for a given database performance problem; knowledge is refined through learning mechanisms.

Further, some embodiments provide a set of infrastructure-specific (meta) models that can be partially customized to reflect environment-specific characteristics.

A number of implementations of the invention have been described. Nevertheless, it will be understood that various modifications may be made without departing from the spirit and scope of the invention. Accordingly, other embodiments are within the scope of the following claims.

The invention claimed is:

1. In a computer system operatively connected to a database system, a method for monitoring and analyzing database performance problems under usage of an interface to a database performance database storing performance data collected during runtime of said database in a redundancy-free form, wherein said performance data is extracted from said performance database and transformed into a problem-specific form specific for a query formulated by a database administrator for detecting a respective individual database performance problem, wherein said query uses multi-dimensional cubes and is based on a logic coupling between said redundancy-free and said problem-specific form, the method comprising:

storing a problem-cube model implementing said logic coupling and comprising information on the mapping relationships between a database performance problem and a respective cube or one or more cube sets appropriate for a problem analysis of a respective performance problem;

in response to detecting a specific performance problem automatically filling said cubes with respective performance data from said performance database by exploiting said implemented logic coupling; and outputting the filled cubes to an output interface usable to deploy said filled cubes for cube-based database performance analysis.

2. The method of claim 1, further comprising:
automatically detecting a performance problem by detecting from an exception processing whether a predefined performance metrics threshold is exceeded.

3. The method of claim 1, further comprising:
providing an initial interactive training mode, wherein performance problems can be identified, said mappings can be created and said cubes can be filled, in order to enable a notification component to trigger and invoke a cube advisor engine component to perform the filling and outputting steps of claim 1.

4. The method of claim 3, further comprising:
providing a subsequently applicable autonomous mode wherein cubes can be automatically created and filled with actual performance data.

5. The method of claim 1, further comprising:
processing feedback information from a user as to whether a mapping between a given cube and a given problem was assessed successful by the user; and
increasing a rank information associated with said mapping in case of a successful mapping.

6. The method of claim 1, further comprising:
storing knowledge about performance problems in a hierarchic structure; and
storing said hierarchic structure in a knowledge base.

7. The method of claim 1, further comprising:
enabling a user to store a new cube; and
enabling a user to associate said new cube with an existing performance problem in said hierarchic structure.

8. The method of claim 1, wherein a set of cubes can be associated with a performance problem, and a first cube of said set is usable for determining the category of a performance problem, and a second cube is usable for determining the cause of said problem with said problem category.

9. The method of claim 1, wherein an existing exception processing is used to trigger said step of detecting a performance problem.

10. The method of claim 1, further comprising:
performing a performance problem hierarchy validation.

11. The method of claim 1, further comprising:
enabling a user to select one or more cubes or one or more cube sets for analysis of a detected performance problem.

12. The method of claim 1, wherein said output interface is arranged to comply with a problem determination algorithm implemented by a computer program.

13. The method of claim 1, further comprising:
validating the current state of said database and generating a list of database performance problems based on existing symptoms.

14. A computer useable storage medium for monitoring and analyzing database performance problems under usage of an interface to a database performance database storing performance data collected during runtime of said database in a redundancy-free form, wherein said performance data is extracted from said performance database and transformed into a problem-specific form specific for a query formulated by a database administrator for detecting a respective individual database performance problem, wherein said query uses multi-dimensional cubes and is based on a logic coupling between said redundancy-free and said problem-specific form, the computer useable storage medium including computer readable program code, wherein the computer readable program code when executed on a computer causes the computer to:

store a problem-cube model implementing said logic coupling and comprising information on the mapping relationships between a database performance problem and a respective cube or one or more cube sets appropriate for a problem analysis of a respective performance problem;

in response to detecting a specific performance problem automatically fill said cubes with respective performance data from said performance database by exploiting said implemented logic coupling; and output the filled cubes to an output interface usable to deploy said filled cubes for cube-based database performance analysis.

* * * * *